United States Patent [19]
Karikawa

[11] 3,956,759
[45] May 11, 1976

[54] COMPACT SINGLE LENS REFLEX CASSETTE CAMERA

[75] Inventor: Tohru Karikawa, Tokyo, Japan

[73] Assignee: Asahi Kogaku Kogyo Kabushiki Kaisha, Tokyo, Japan

[22] Filed: Aug. 15, 1974

[21] Appl. No.: 497,604

[30] Foreign Application Priority Data
Aug. 21, 1973  Japan.......................... 48-97246[U]

[52] U.S. Cl.................................. 354/150; 354/152
[51] Int. Cl.$^2$........................................ G03B 19/12
[58] Field of Search ............. 354/152, 155, 174, 224, 354/225, 219, 150, 167; 352/72

[56] References Cited
UNITED STATES PATENTS

| | | | |
|---|---|---|---|
| 2,909,109 | 10/1959 | Back | 354/155 |
| 3,656,421 | 4/1972 | Ataka | 354/155 |
| 3,690,235 | 9/1972 | Ainslie et al. | 352/72 X |

*Primary Examiner*—L. T. Hix
*Assistant Examiner*—Alan Mathews
*Attorney, Agent, or Firm*—Wolder & Gross

[57] ABSTRACT

A cassette type single lens reflex camera includes a longitudinally extending zoon lens system and a replacable film cassette disposed in opposite sides of the camera casing, the cassette having enlarged film storing opposite end sections joined by a tubular film guide with an inwardly vertically facing framing window. A 45° semitransparent first mirror intercepts the zoom lens longitudinal optical axis to reflect lens traversing light through a rear lens group onto a second 45° mirror mounted in the casing in the space between the cassette end sections and oriented to deflect the light from the first mirror to the cassette window. The light traversing the first mirror traverses, successively imaging and field lenses an erecting prism and an eyepiece lens which define a viewfinder.

6 Claims, 3 Drawing Figures

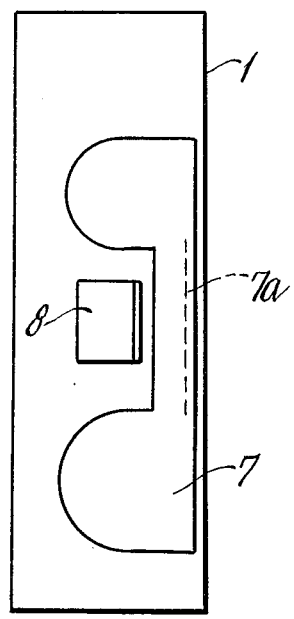
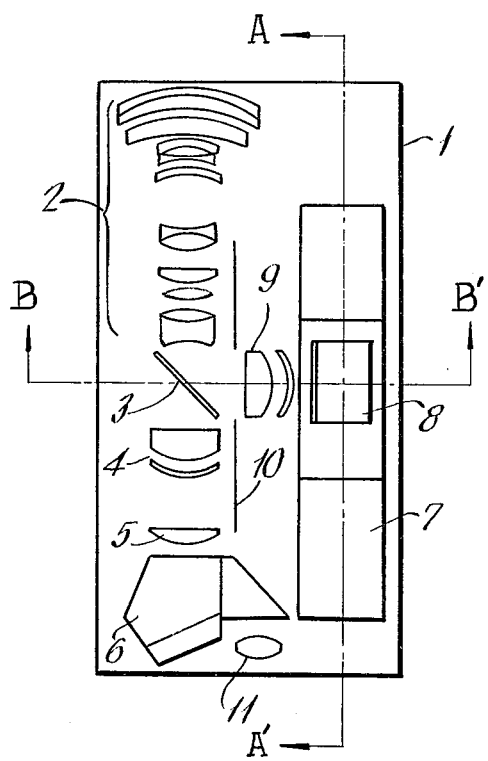
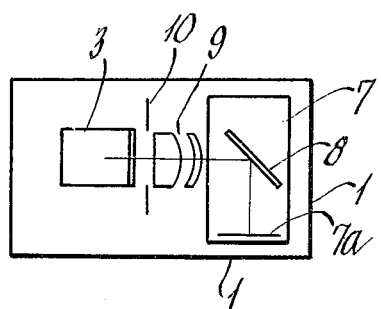

COMPACT SINGLE LENS REFLEX CASSETTE CAMERA

BACKGROUND OF THE INVENTION

The present invention relates generally to improvements in cameras and it relates more particularly to an improved compact single lens reflex camera of the film cassette type and provided with a zoom lens objective lens system.

Compact cameras employing a 16mm cassette film or other similar narrow film are currently widely used and are known as handy pocket type cameras. With such cameras of conventional construction, the image formed in the narrow or short film frame can be properly enlarged only within relatively narrow limits. To obtain a highly enlarged clear picture of satisfactory resolution of a subject, it is advisable to photograph the subject as large as possible. However, restricted by the photographing conditions such as location and other parameters, the angle view cannot always be very freely selected. For the purpose of obtaining wide angles of view, some of the currently used cameras of the subject type are equipped with a close-up adapter lens which, however, does not work very effectively under ordinary photographing operations. It is known in cameras employing a film with a small frame size that several remarkable and highly desirable effects can be obtained by the use of a zoom lens that provides an adjustable angle of view. Such a zoom lens, however, is highly unsuitable to fully achieve the desired effects and results unless the camera is so designed that the adjusted angle of view is readily recognized or observed by the photographer. However, with the view finders commonly employed in conventional compact cameras of the subject type any adjustment of the angle of view with satisfactory parallax correction is not generally realized.

It is accordingly clear that the conventional cassette type compact single lens reflex camera possesses numerous drawbacks and disadvantages which are not remedied by the use of a zoom lens of common design.

SUMMARY OF THE INVENTION

It is a principal object of the present invention to provide an improved compact, cassette type, single lens reflex camera.

Another object of the present invention is to provide an improved compact, cassette type single lens reflex camera having an adjustable field angle.

Still another object of the present invention is to provide an improved compact single lens reflex compact camera having a self contained zoom lens.

A further object of the present invention is to provide a camera of the above nature characterized by its high reliability, superior optical properties, ease and convenience of use and great versatility and adaptability.

The above and other objects of the present invention will become apparent from a reading of the following description taken in conjunction with the accompanying drawings which illustrate a preferred embodiment thereof.

It is barely possible to produce a compact camera of the subject type if a zoom lens is built into and contained in the camera body in accordance with the conventional disposition and arrangement of the lens, viewfinder and film cassette. As a consequence of such manner of arrangement the width, depth and height of the resulting camera is determined by the length of film cassette, the length of zoom lens and the dimensions of viewfinder, respectively. According to the present invention a zoom lens, viewfinder and film cassette are functionally arranged with respect to each other to produce a compact and handy single lens reflex camera.

In a sense the present invention contemplates the provision of a cassette type camera comprising a casing, a film cassette replacably housed in the casing and extending longitudinally therein and including opposite enlarged end sections and a tubular film guide connecting the end section and having a frame window, a longitudinally extending objective lens system located in the casing and laterally spaced from the cassette, a first reflector intercepting the lens system longitudinal optical axis and oriented to deflect the rays traversing the lens system toward the space between the cassette end sections and a second reflector mounted in the casing between the cassette end sections and oriented to deflect the rays deflected by the first reflector thereto to the cassette frame window.

The lens system is a zoom lens with its longitudinal front optical axis being parallel to the Z-axis and the first reflector is a semitransparent mirror at 45° to the front optical axis to reflect the rays along a second optical axis parallel to the X-axis and the second reflector is 45° to the second optical axis and deflects the incident rays along a third optical axis parallel to the Y-axis. The X, Y and Z axes are mutually perpendicular. A lens group is disposed on the second optical axis between the reflectors and a view finder lens and image erecting prism system are disposed rearwardly of the first reflector.

The improved camera is compact, highly reliable, easy and convenient to use, of excellent optical properties and of great versatility and adaptability.

BRIEF DESCRIPTION OF THE DRAWING

FIG. 1 is a horizontal sectional view of a camera embodying the present invention illustrating the arrangement of the components in the camera casing.

FIG. 2 is a sectional view taken along line A–A' in FIG. 1; and

FIG. 3 is a sectional view taken along line B–B' in FIG. 1.

DESCRIPTION OF THE PREFERRED EMBODIMENT

Referring now to the drawings which illustrate a preferred embodiment of the present invention, the reference numeral 1 generally designates a camera body in the shape of a rectangular parallelopiped casing of shallow depth. Within the space inside the camera body 1 and laterally offset from or on one side of its longitudinal medial or Z axis are arranged in sequence an objective zoom lens 2, which may be of known design, excluding the master lens, a semitransparent mirror 3 in an oblique position at 45° to the longitudinal axis, an imaging lens 4 for the viewfinder, a field lens 5 and an erecting prism 6, all being arranged along the axis of incident light in the above order. Within the space in the camera body 1 and on the opposite side of its longitudinal medial axis is disposed a roughly channel-shaped film cassette 7 loaded with a film 7a. The film cassette 7 is disposed parallel to the Z-axis in such a position that one of its longitudinal edges extends parallel to and faces toward the optical axis of the aforesaid lenses and the recessed portion or space between the enlarged end film storing sections of the film cassette 7 is in alignment with the semi-transparent mirror 3. A total reflection mirror 8 is arranged in an oblique position at a 45° angle to the X or lateral axis within the recessed portion of the film cassette 7, and between the total reflection mirror 8 and the semi-transparent mirror 3 are located a photographing master lens system 9 and a shutter 10. Indicated at 11 is an ocular arranged in a position close to the longitudinal axis of the camera body 1 and side by side to the erecting prism 6 so as to receive the incident light traversing the erecting prism 6.

With the foregoing construction and light from the subject to be photographed, after passing through the zoom lens longitudinal main section 2, reaches the semi-transparent mirror 3, being partially reflected thereby and the balance passing through it. A portion of the reflected light travels in a perpendicular direction passing through the shutter 10 and photographing master lens system 9 to the total reflection mirror 8, at which the light is totally reflected in the Y direction perpendicular to X and Z to form an image on a frame of the film 7a loaded in the film cassette 7 and delineated by a rectangular window formed in the wall of the cassette tubular film guide section connecting the end sections thereof.

On the other hand, the portion of light traversing or passing through the semi-transparent mirror 3 travels through the viewfinder imaging lens 4 and field lens 5 to the erecting prism 6. The prism incident light is then reflected within the erecting prism 6 and directed to the ocular 11 to form an erected image, thereby facilitating the photographing operation.

The foregoing construction provides an image in a normal position but not in a mirrored position, because the light from the subject is reflected twice, by, the semi-transparent mirror 3 and total reflection mirror 8, before forming an image on the film 7a. The location of the total reflection mirror 8 within the recessed portion of the film cassette 7 and the positioning of the film cassette parallel to the optical axis of the zoom lens 2 and erecting prism 6 make possible the assembly of these components in a narrow space thereby permitting the fabrication of a highly compact camera body 1.

While there has been described and illustrated a preferred embodiment of the present invention it is apparent that numerous alterations, omissions and additions may be made without departing from the spirit thereof.

I claim:

1. The combination of a cassette type camera and a film carrying cassette comprising a casing having a longitudinally extending Z-axis, a film cassette replaceably housed in said casing and extending longitudinally thereof and including at longitudinally spaced opposite ends thereof enlarged film storing sections connected by a film guide section, guiding film between said storing sections in a longitudinal direction parallel to said Z-axis and having a frame delineating window facing inwardly in a direction parallel to the Y-axis, an objective lens system located in said casing and spaced a distance the X-axis from said cassette and having an elongated forward portion, said forward portion of said objective lens system extending along a first optical axis parallel to the Z-axis, a first reflector intercepting said first optical axis and oriented to deflect rays traversing said forward portion of said optical lens system along said first optical axis, along a second optical axis parallel to the X-axis toward the space between said cassette end sections, and a second reflector mounted in said casing between said cassette end sections and oriented to deflect the rays deflected by said first reflector thereto along a third optical axis parallel to the Y-axis to said cassette window, said X, Y and Z axes being mutually perpendicular.

2. The combination of claim 1 wherein said lens system comprises a zoom lens system.

3. The combination of claim 2 wherein said lens system includes a lens group along said second optical axis between said first and second reflectors.

4. The combination of claim 1 wherein said first reflector comprises a semitransparent mirror intercepting said first optical axis at an angle of 45° and including a view finding optical system disposed rearwardly of said first reflector and receiving the light traversing said first reflector.

5. The combination of claim 4 wherein said view finding optical system comprises in succession from the front to the rear an imaging lens, a field lens, an erecting prism and an ocular lens.

6. The combination of claim 1 wherein said lens system and said cassette are disposed in said casing on opposite sides of said casing.

* * * * *